United States Patent
Olczak

(10) Patent No.: US 6,811,274 B2
(45) Date of Patent: Nov. 2, 2004

(54) POLARIZATION SENSITIVE OPTICAL SUBSTRATE

(75) Inventor: Eugene Olczak, Glenville, NY (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 10/065,957

(22) Filed: Dec. 4, 2002

(65) Prior Publication Data

US 2004/0109303 A1 Jun. 10, 2004

(51) Int. Cl.[7] ................................................ F21V 7/04
(52) U.S. Cl. ........................ 362/31; 362/26; 362/551; 362/556; 362/558; 362/520; 362/561; 362/511; 362/583; 362/593; 359/487
(58) Field of Search ............................ 362/19, 26, 31, 362/551, 556, 558, 561, 511, 520, 560, 583, 293; 349/96; 359/487

(56) References Cited

U.S. PATENT DOCUMENTS

| | | | |
|---|---|---|---|
| 467,208 A | 1/1892 | Strobel | |
| 2,403,731 A | 7/1946 | MacNeille | 88/65 |
| 4,542,449 A | 9/1985 | Whitehead | 362/330 |
| 4,576,850 A | 3/1986 | Martens | 428/156 |
| 4,906,070 A | 3/1990 | Cobb, Jr. | 350/286 |
| 4,984,144 A | 1/1991 | Cobb, Jr. et al. | 362/339 |
| 5,056,892 A | 10/1991 | Cobb, Jr. | 359/831 |
| 5,771,328 A | 6/1998 | Wortman et al. | 385/146 |
| 5,861,990 A | 1/1999 | Tedesco | 359/599 |
| 5,917,664 A | 6/1999 | O'Neill et al. | 359/831 |
| 5,919,551 A | 7/1999 | Cobb, Jr. et al. | 428/156 |
| 5,982,540 A | * 11/1999 | Koike et al. | 359/487 |
| 6,002,829 A | 12/1999 | Winston et al. | 385/146 |
| 6,044,196 A | 3/2000 | Winston et al. | 385/146 |
| 6,052,164 A | 4/2000 | Cobb, Jr. et al. | 349/64 |
| 6,091,547 A | 7/2000 | Gardiner et al. | 359/625 |
| 6,108,131 A | 8/2000 | Hansen et al. | 359/486 |
| 6,208,463 B1 | 3/2001 | Hansen et al. | 359/486 |
| 6,243,068 B1 | 6/2001 | Evanicky et al. | 345/102 |
| 6,277,471 B1 | 8/2001 | Tang | 428/172 |
| 6,280,063 B1 | 8/2001 | Fong et al. | 362/333 |
| 6,322,236 B1 | 11/2001 | Campbell et al. | 362/333 |
| 6,335,999 B1 | 1/2002 | Winston et al. | 385/146 |
| 6,354,709 B1 | 3/2002 | Campbell et al. | 362/31 |
| 6,356,391 B1 | 3/2002 | Gardiner et al. | 359/628 |

(List continued on next page.)

FOREIGN PATENT DOCUMENTS

| | | |
|---|---|---|
| WO | WO 98/33006 | 7/1998 |
| WO | WO 99/42861 | 8/1999 |
| WO | WO 99/59005 | 11/1999 |
| WO | WO 99/63397 | 12/1999 |
| WO | WO 01/27527 | 4/2001 |
| WO | WO 01/27663 | 4/2001 |
| WO | WO 01/79923 | 10/2001 |

OTHER PUBLICATIONS

David J. Whitehouse, Handbook of Surface Metrology, IOP Publishing Ltd.: 1994, pp. 49–58.
Max Levy Autograph, Inc. MLA 4000 Series Ultra Precision Micro Machining/Contouring System, Bulletin 2050, Advertisement.
3M Innovation, 3M Brightness Enhancement Film (III) Advertisement.
Backlight Optics, pp. F–2/37–F–2/44.
Machine Design, "Plastic Film Reflects Around the Corner", p. 52, Augsut 1997.

Primary Examiner—Stephen Husar
Assistant Examiner—Bertrand Zeaade
(74) Attorney, Agent, or Firm—Cantor Colburn LLP

(57) ABSTRACT

A polarization sensitive optical substrate comprises a planar surface and a first thin film applied to the planar surface. The first film has a thickness of $\lambda/4/n$, where $\lambda$ is the wavelength of light incident upon the first film and n is the refractive index of the first film. A prismatic surface is optionally also thin film coated, and is in opposition to the planar surface.

47 Claims, 15 Drawing Sheets

U.S. PATENT DOCUMENTS

| | | |
|---|---|---|
| 6,456,437 B1 | 9/2002 | Lea et al. .................... 359/625 |
| 6,535,337 B1 * | 3/2003 | Tanaka et al. .............. 359/599 |
| 6,607,279 B2 * | 8/2003 | Niida et al. ................... 362/26 |
| 6,631,031 B2 * | 10/2003 | Lee et al. ................... 359/487 |
| 2002/0061178 A1 | 5/2002 | Winston et al. ............. 385/133 |
| 2002/0080598 A1 | 6/2002 | Parker et al. ................. 362/31 |
| 2002/0097496 A1 | 7/2002 | Lu .............................. 359/628 |
| 2002/0101659 A1 | 8/2002 | Hansen et al. ............. 359/486 |

* cited by examiner

POLARIZATION SENSITIVE OPTICAL SUBSTRATE

BACKGROUND OF INVENTION

This invention relates to optical substrates and, more specifically, to thin film coated optical substrates for discriminating between the polarization states of light transmitted therethrough.

In backlight computer displays or other display systems, optical films are commonly used to direct light. For example, in backlight displays, brightness enhancement films use prismatic structures to direct light along a viewing axis (i.e., an axis substantially normal to the display). This enhances the brightness of the light viewed by a user of the display and allows the system to consume less power in creating a desired level of on-axis illumination. Films for turning light can also be used in a wide range of other optical designs, such as for projection displays, traffic signals, and illuminated signs.

Backlight displays and other systems use layers of films stacked and arranged so that the prismatic surfaces thereof are perpendicular to one another and are sandwiched between other optical films known as diffusers. Diffusers have highly irregular surfaces.

Light turning and diffusion are typically handled with a 3 or 4 film stack. The stack is comprised of brightness enhancing films and diffuser films. Polarization recycling is typically accomplished by using other films in addition to the typical stack (sometimes one of the films is replaced by this additional element). This additional film may be a multilayer birefringent film, a liquid crystal birefringent film, a birefringent film with scattering particles or a MacNielle type array of polarizing beam splitter prisms formed in a film.

SUMMARY OF INVENTION

A first embodiment of the invention features a polarization sensitive optical substrate which comprises a planar surface and a first thin film applied to the planar surface. The first thin film has a thickness of $\lambda/4/$, where $\lambda$ is the wavelength in air of light incident upon the first thin film and n is the refractive index of the first thin film. A first prismatic surface, having a prescribed peak angle, $\alpha$, height, h, length, l, and pitch, p, is optionally also coated with a second thin film, and is in opposition to the planar surface. Yet further, the planar surface may be replaced with a second prismatic surface similar to the first prismatic surface. One or both of the prismatic surfaces may be randomized in their peak angle, $\alpha$, height, h, length, l, and pitch, p.

The second prismatic surface may also have a random or non-random peak angle, $\gamma$, height, g, length, l, and pitch, q. The prismatic surface may also comprise a refractive index different than that of the substrate.

A second embodiment of the invention features a backlight display device comprising an optical source for generating light. A light guide guides the light therealong. A reflective device, positioned along the light guide, reflects the light out of the light guide. The backlight display device includes a polarization sensitive optical substrate comprising a planar surface receptive of light from the light guide and a first thin film applied to the planar surface. The first thin film has a thickness of $\lambda/4/$, where $\lambda$ is the wavelength of light incident upon the first thin film and n is the refractive index of the first thin film. A first prismatic surface is in opposition to the planar surface and a spacer is positioned between the polarization sensitive optical substrate and the light guide for preventing contact therebetween. The first prismatic surface, having a prescribed peak angle, $\alpha$, height, h, length, l, and pitch, p, is optionally also coated with a second thin film, and is in opposition to the planar surface. Yet further, the planar surface may be replaced with a second prismatic surface similar to the first prismatic surface. One or both of the prismatic surfaces may be randomized in their peak angle, $\alpha$, height, h, length, l, and pitch, p. The second prismatic surface may have peak angle, $\gamma$, height, g, length, l, and pitch, q.

The invention works by allowing highly oblique light, such as that exiting the backlight display device to enter the polarization sensitive optical substrate at a glancing angle (e.g., between 60 and 90 degrees as measured from the normal to the average surface or a nominal plane) without an intervening diffuser. The polarization sensitive optical substrate directs the incident light such that the light exiting therefrom is in a direction that is close to the average surface normal of the polarization sensitive optical substrate. This results in partial polarization of the exiting light. The polarization effect is enhanced by the use of thin film coatings applied to the surfaces of the polarization sensitive optical substrate. For example, a single thin film of ¼ wavelength of light in thickness of a high index of refraction material such as a metal oxide such as $TiO_2$ may be applied to a planar surface of the polarization sensitive optical substrate. An additional substrate may be located above the polarization sensitive optical substrate to provide diffusion of light. This substrate may be a retarder film that is used to rotate the plane of polarization of the light exiting the polarization sensitive optical substrate such that the light is better matched to the input polarization axis of an LCD. Alternatively, for this purpose the retarder film could be built into the lower LCD substrate.

DETAILED DESCRIPTION

Figure 1:
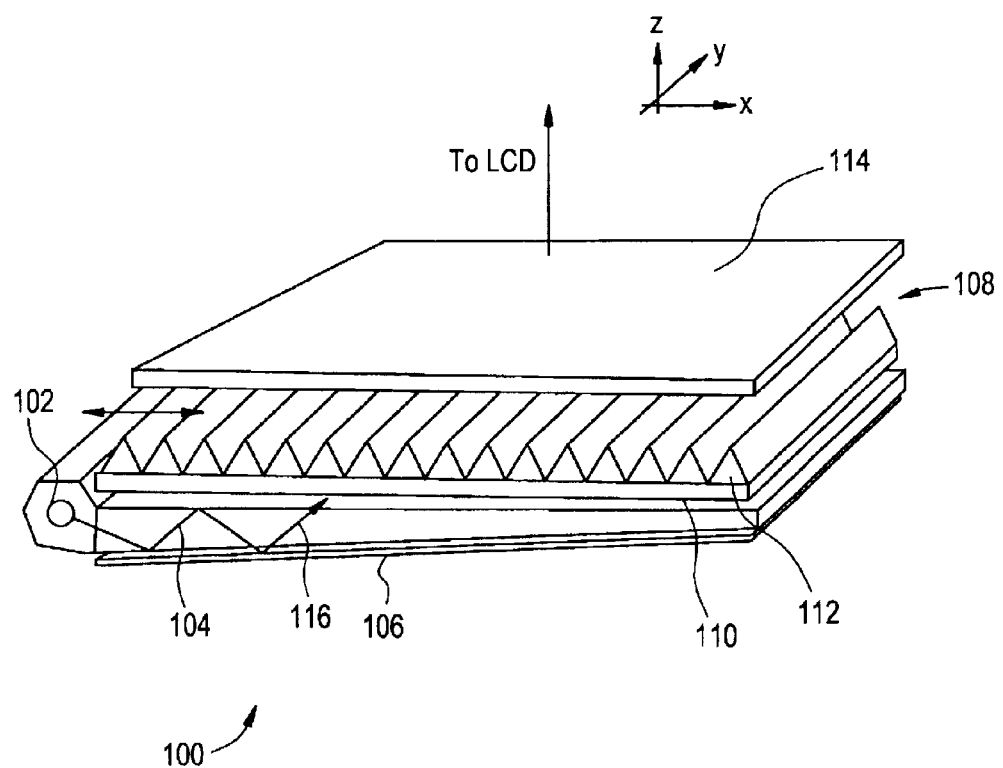
FIG. 1 is a three dimensional view of a back light display device.

In FIG. 1 a perspective view of a backlight display 100 device is shown. The backlight display device 100 comprises an optical source 102 for generating light 116. A light guide 104 guides the light 116 therealong by total internal reflection (TIR). The light guide 104 contains disruptive features that cause the light 116 to escape the light guide 104. A reflective substrate 106 positioned along the lower surface of the light guide 104 reflects any light 116 escaping from the lower surface of the light guide 104 back through the light guide 104 and toward an optical substrate 108. At least one optical substrate 108 is receptive of the light 116 from the light guide 104. The optical substrate 108 comprises on one side thereof a planar surface 110 and on a second opposing side thereof a prismatic surface 112. The optical substrate 108 is receptive of the light 116 and acts to turn the light 116 in a direction that is substantially normal to the optical substrate 108 along a direction z as shown. The light 116 is then directed to an LCD for display. A diffuser 114 may be located above the optical substrate 108 to provide diffusion of light. This substrate 114 may be a retarder film that is used to rotate the plane of polarization of the light exiting the optical substrate 108 such that the light is better matched to the input polarization axis of an LCD. A half wave retarder, for example, may be used to rotate the substantially linearly polarized light exiting the optical substrate 108. The retarder may be formed by stretching a textured or untextured polymer substrate along one axis thereof in the plane of the substrate. Alternatively, a liquid or solid crystal device may be used. Alternatively, for this purpose the retarder film 114 could be built into the lower LCD substrate.

Figure 21:
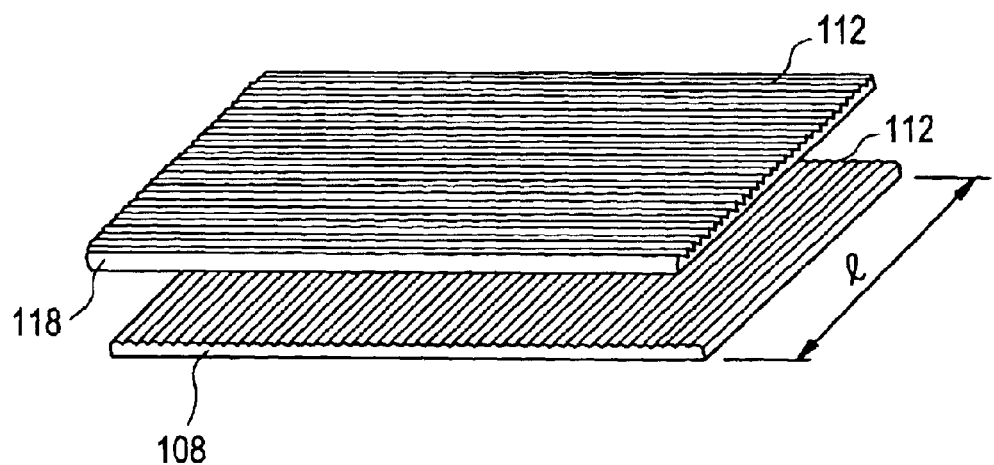
FIG. 21 is a three dimensional view of optical substrates positioned such that the direction of prismatic surfaces thereon are positioned at an angle with respect to one another.

As best understood from FIGS. 1 and 21, the backlight display device 100 may include a plurality of optical substrates 108, 110 wherein the plurality of optical substrates 108, 110 are positioned such that the direction of the prismatic surfaces 112 are positioned at an angle with respect to one another, e.g., 90 degrees.

Figure 2:
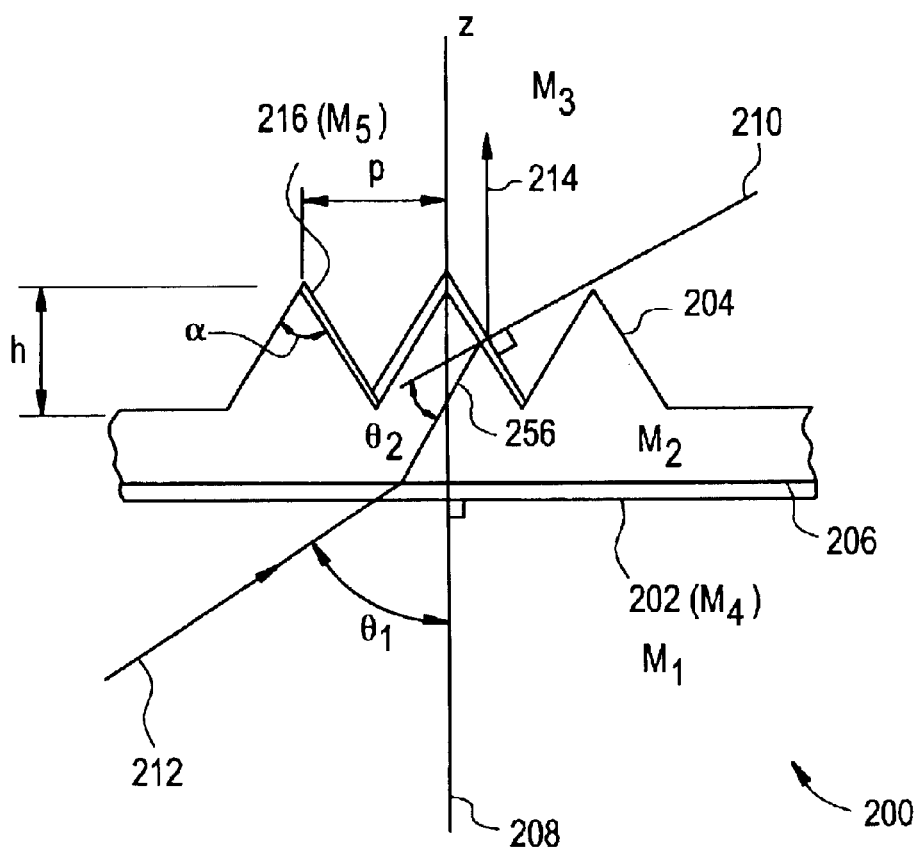
FIG. 2 is a first cross section of a segment of a thin film coated polarization sensitive optical substrate including a single prismatic surface and showing the path of light therethrough.

In FIG. 2 a cross section of a segment of a thin film coated polarization sensitive optical substrate 200 showing the path of a light beam 212, 256, 214 therethrough is depicted. The light beam 212 is incident upon the optical substrate 200 at an angle of $\theta_1$ which may span 0 to 90 degrees and which will include Brewster's angle $\theta_B$. The polarization sensitive optical substrate 200 comprises a planar surface 206 and a first thin film 202 applied to the planar surface 206. The first thin film ("quarter-wave film") 202 has a thickness of $\lambda/4/n4$, where $\lambda$ is the wavelength of the light beam 212 incident upon the first thin film 202 and $n_4$ is the refractive index of the first thin film. As best understood, for a "quarter wave stack" the thickness of one or more thin films in a stack is generally given by $(1+2\times j) \lambda/4/$, where j is an integer. The polarization sensitive optical substrate 200 also includes a prismatic surface 204 in opposition to the planar surface 206. The prismatic surface 204 comprises a plurality of prism structures having a peak angle of $\alpha$, a pitch between peaks of p, length, l, and a height of h. The polarization sensitive optical substrate 200 may also include a second thin film 216 (only a segment of which is shown) applied to the prismatic surface 204. The second thin film 216 has a thickness of $\lambda/4/N5$, where $\lambda$ is the wavelength of the light beam 256 incident upon the second thin film 216 from within the polarization sensitive optical substrate 200 and $n_5$ is the refractive index of the second thin film 216. The first and second thin films 202, 216 may be the same or different and may be for example comprised of a metal oxide, such as titanium oxide ($TiO_2$). Generally, materials with a refractive index, n, between about 1.9 and 3.0 are suitable as thin films 202, 216. It will be appreciated that the thin films 202, 216 may comprise multiple thin films (e.g., a "stack") of varying thickness and refractive indices positioned one above the other. As best understood from FIG. 2, the opposing surfaces 206, 204 may both be prismatic surfaces. In such a case the surface 206 is in the same nature as prismatic surface 204. When such is the case, the peak angles, $\alpha$, of the prisms 204 may be the same or different, the pitch, p, between peaks may be the same or different, the length, l, may be the same or different and the height, h of the peaks may be the same or different. Still further the opposing surfaces 206, 204 may both be randomized in their peak angles, $\alpha$, their pitch, p, their length, l, and their height, h.

Continuing in FIG. 2, a beam of light 212 emanating, for example, from a backlight display device, is incident upon the first thin film 202 applied to the planar surface 206 at an angle of $\theta_1$. According to well known optical principles, the beam of light 212 when passing from a medium of refractive index $n_1$ to a medium of refractive index $n_2$, where $n_2$ is greater than $n_1$, is deflected so as to follow the path 256 within the optical substrate 200. The beam of light 256 within the optical substrate 200 then falls upon the prismatic surface 204 at an angle of $\theta_2$ and again, according to well known optical principles, when passing from a medium of refractive index $n_2$ to a medium of refractive index $n_3$, where $n_2$ is greater than $n_3$, is deflected so as to follow the path 214.

Figure 3:
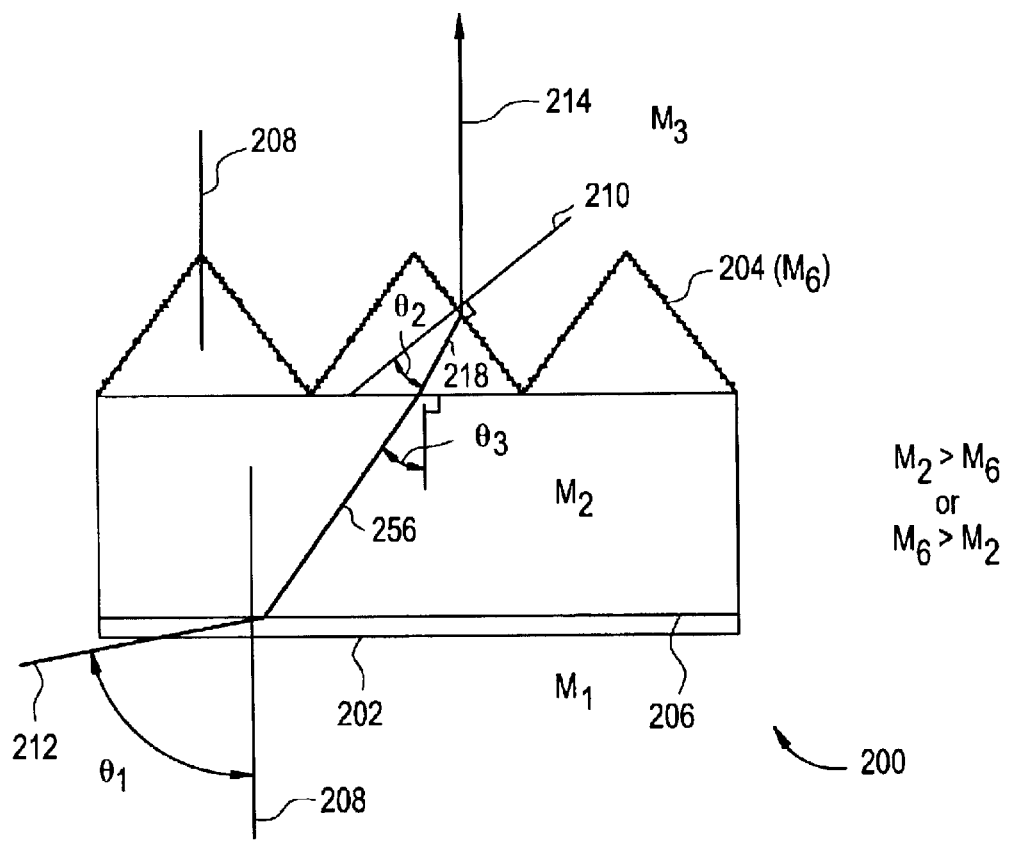
FIG. 3 is a second cross section of a segment of a thin film coated polarization sensitive optical substrate including a single prismatic surface and showing the path of light therethrough.

For example, in FIG. 3, where a polycarbonate substrate 206 with a refractive index of 1.59 and a thin film coating 216 having a refractive index, $n_6$, of 2.02, and $\theta_1$ is about 80 degrees and $\theta_2$ is about 15.5 degrees, the s-polarization transmission is 0.075×0.987×0.507=0.037=3.7%; and the p-polarization transmission is 0.925×0.996×0.949=0.87= 87%. Thus, the light exiting the substrate 200 along path 214 is predominantly p-polarized light. Most of the s-polarized light does not escape the substrate 200 and may be recycled. The middle term of the above products reflects the interface between the substrate and the prism structures when they have different refractive indices.

In an alternative embodiment of the substrate 200, FIG. 3 shows a second cross section of a segment of the thin film coated polarization sensitive optical substrate 200 including a prismatic surface 204. In FIG. 3, a beam of light 212 emanating, for example, from a backlight display device, is incident upon the planar surface 206 at an angle of $\theta_1$. According to well known optical principles, the beam of light 212 when passing from a medium of refractive index $n_1$ to a medium of refractive index $n_2$, where $n_2$ is greater than $n_1$, is deflected so as to follow the path 256 within the optical substrate 200. The beam of light 256 within the optical substrate 200 then falls upon the prismatic structure 204 of the prismatic surface at an angle of $\theta_3$. The prismatic surface 204 has a refractive index of $n_6$ which may be different than the refractive index, $n_2$ of the substrate 206. It will be understood that $n_6$ may be greater than or less than $n_2$. Again, for example, according to well known optical principles, when passing from a medium of refractive index $n_2$ to a medium of refractive index $n_6$, where $n_2$ is greater than $n_6$, the light is deflected so as to follow the path 218 and when passing from a medium of refractive index $n_6$ to a medium of refractive index $n_3$, where $n_6$ is greater than $n_3$, is deflected so as to follow the path 214.

Figure 4:
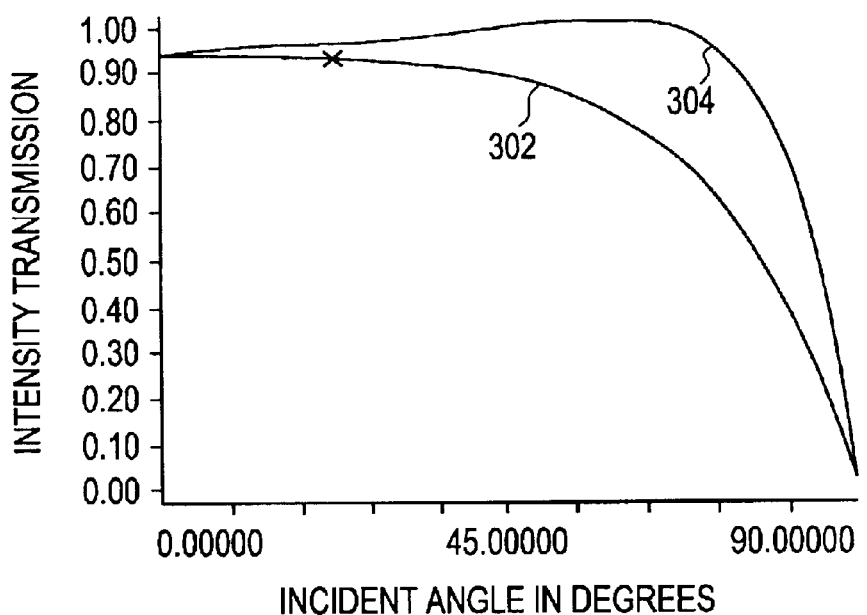
FIG. 4 is a graphical depiction of the intensity of s-polarized and p-polarized light within the polycarbonate substrate of FIG. 3, as a function of the angle of incidence, $\theta_1$, of a beam of light having a wavelength of about 550 nm falling upon an uncoated planar surface of the substrate and wherein the substrate has a refractive index of about 1.59.

In FIG. 4 a graphical depiction of the intensity of s-polarized 302 and p-polarized 304 light within the polycarbonate substrate 200 of FIG. 3 is shown, as a function of the angle of incidence, $\theta_1$, of a beam of light 212 having a wavelength of about 550 nm falling upon an uncoated planar surface 206 of the substrate 200 and wherein the substrate 200 has a refractive index, $n_2$, of about 1.59.

Figure 5:
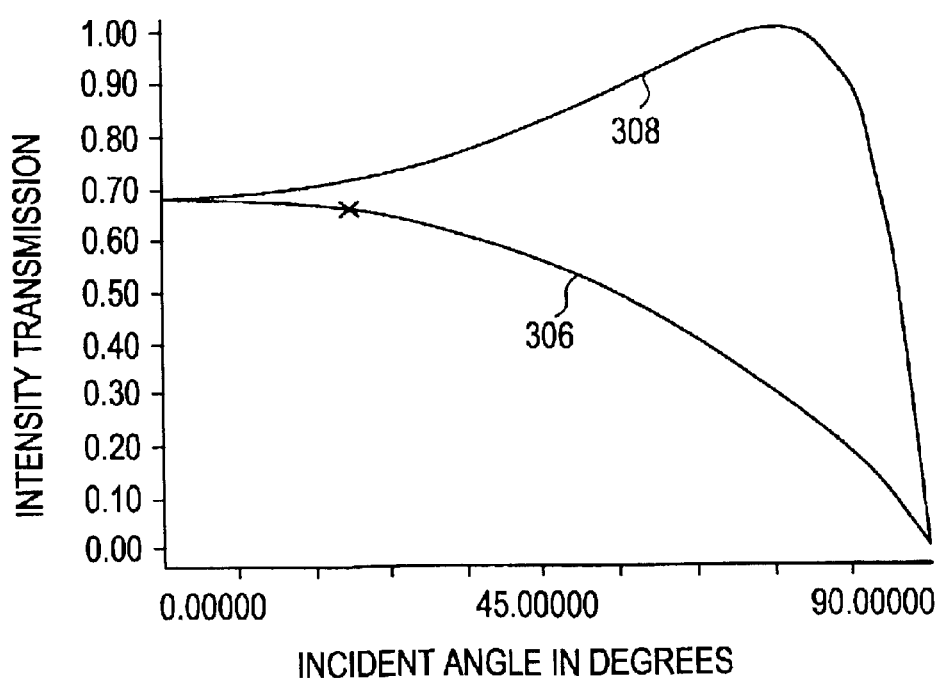
FIG. 5 is a graphical depiction of the intensity of s-polarized and p-polarized light within the polycarbonate substrate of FIG. 3, as a function of the angle of incidence, $\theta_1$, of a beam of light having a wavelength of about 550 nm falling upon an approximately 58 nm thick $TiO_2$ thin film coated planar surface of the substrate and wherein the substrate has a refractive index of about 1.59.

In FIG. 5 a graphical depiction of the intensity of s-polarized 306 and p-polarized 308 light within the polycarbonate substrate 200 of FIG. 3 is shown, as a function of the angle of incidence, $\theta_1$, of a beam of light 212 having a wavelength of about 550 nm falling upon an approximately 58 nm quarter wave thick $TiO_2$ thin film coated planar surface 206 of the substrate 200 and wherein the substrate 200 has a refractive index, $n_2$, of about 1.59. As can be seen in comparing FIGS. 4 and 5, there is a much greater sensitivity in transmission for the p-polarized 308 light in the substrate 200 when the planar surface 206 is coated (FIG. 5) than when the planar surface is uncoated (FIG. 4).

Figure 6:
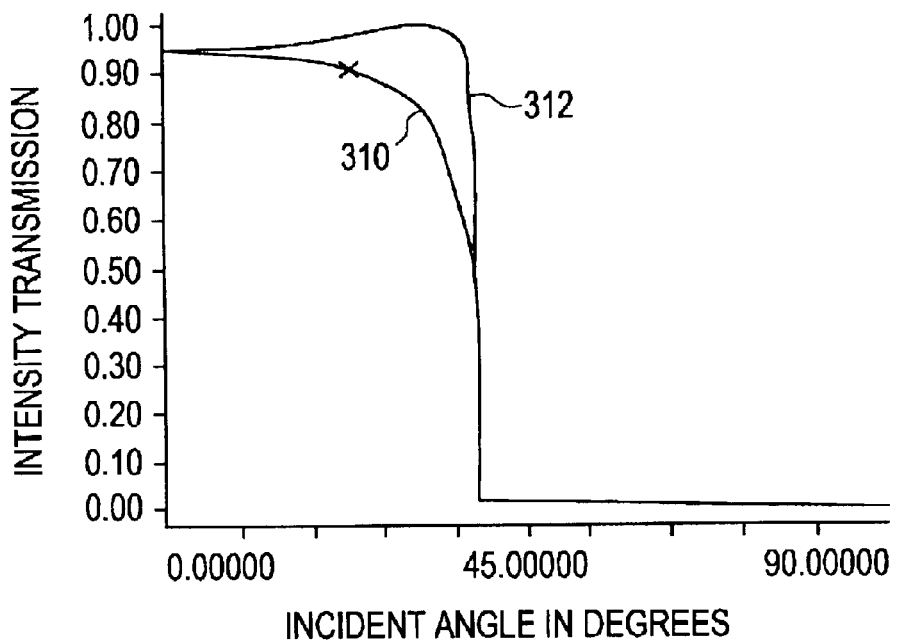
FIG. 6 is a graphical depiction of the intensity of s-polarized and p-polarized light that has exited the uncoated prismatic surface of FIG. 3, as a function of the angle of incidence, $\theta_2$, of the beam of light within the substrate falling upon the prismatic surface, wherein the prismatic surface has a refractive index of about 1.59.

In addition to the improvement seen in the transmission of p-polarized light for a coated planar surface (FIG. 5), there is also an improvement in the transmission of p-polarized light exiting a coated prismatic surface 204 of the substrate 200 of FIG. 3. In FIG. 6 a graphical depiction of the intensity of s-polarized 310 and p-polarized 312 light that has exited an uncoated prismatic surface 204 of FIG. 3, as a function of the angle of incidence, $\theta_2$, of the beam of light 256 within the substrate 200 falling upon the uncoated prismatic surface 204, wherein the prismatic surface 204 has a refractive index of about 1.59.

Figure 7:
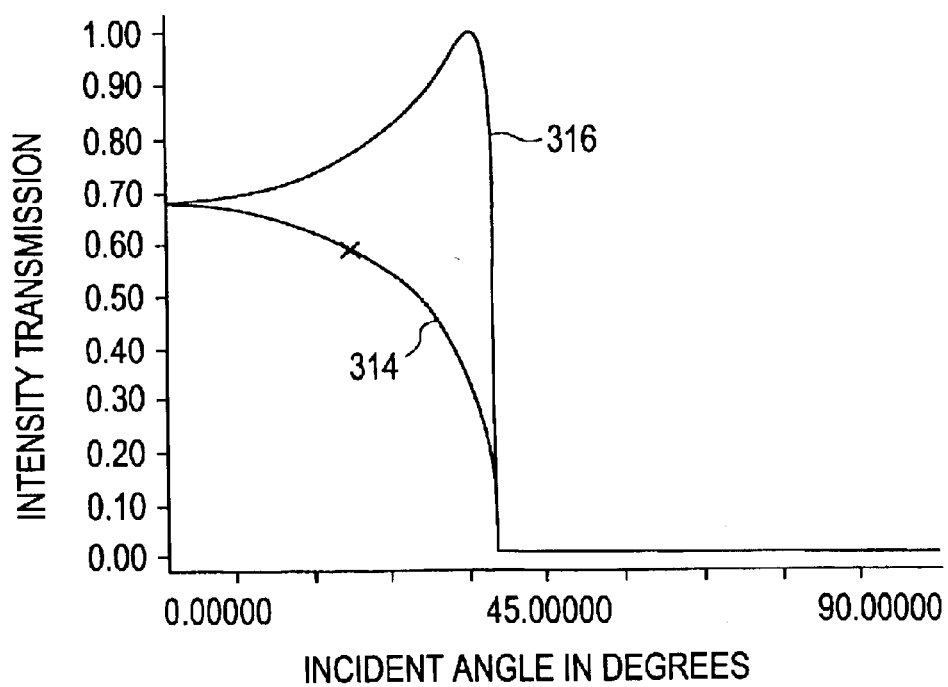
FIG. 7 is a graphical depiction of the intensity of s-polarized and p-polarized light that has exited the thin film coated prismatic surface of FIG. 3, as a function of the angle of incidence, $\theta_2$, of the beam of light within the substrate falling upon the prismatic surface, wherein the prismatic surface has a refractive index of about 1.59.

In FIG. 7 a graphical depiction of the intensity of s-polarized 314 and p-polarized 316 light that has exited an approximately 58 nm quarter wave thick $TiO_2$ thin film coated prismatic surface 204 of FIG. 3, is shown as a function of the angle of incidence, $\theta_2$, of the beam of light 256 within the substrate 200 falling upon the prismatic surface 204, wherein the prismatic surface 204 has a refractive index, $n_6$, of about 1.59. As can be seen in comparing FIGS. 6 and 7, there is a much greater sensitivity in transmission for the p-polarized 316 light in the substrate 200 when the prismatic surface 206 is coated (FIG. 7) than when the prismatic surface 206 is uncoated (FIG. 6).

Figure 8:
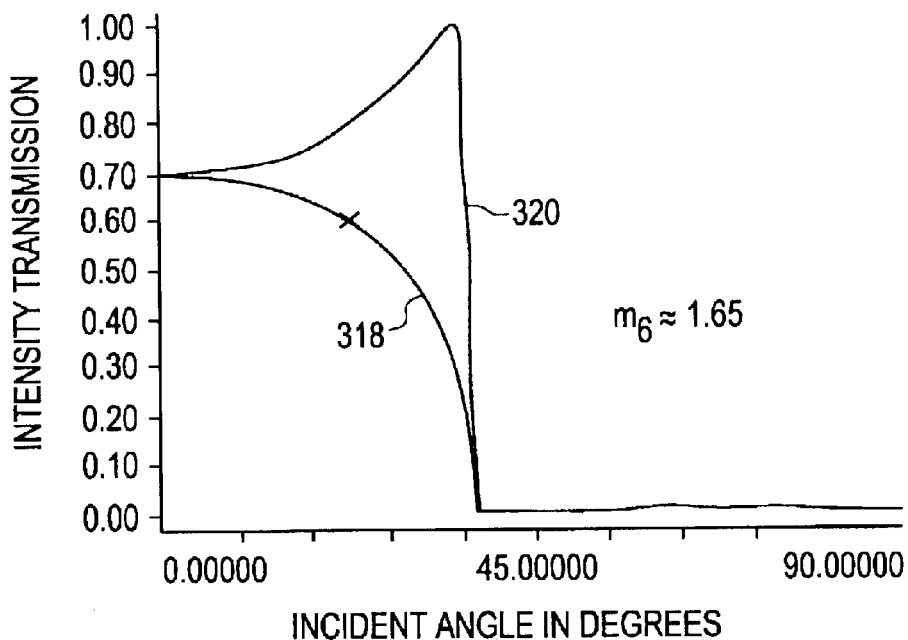
FIG. 8 is a graphical depiction of the intensity of s-polarized and p-polarized light that has exited the thin film coated prismatic surface of FIG. 3, as a function of the angle of incidence, $\theta_2$, of the beam of light within the substrate falling upon the prismatic surface, wherein the prismatic surface has a refractive index of about 1.65.
Figure 9:
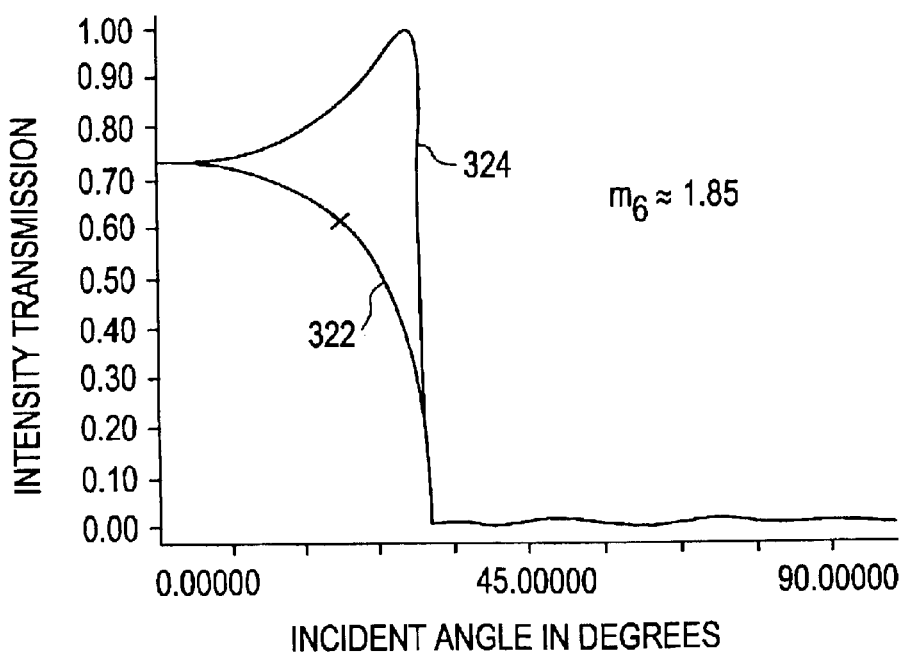
FIG. 9 is a graphical depiction of the intensity of s-polarized and p-polarized light that has exited the thin film coated prismatic surface of FIG. 3, as a function of the angle of incidence, $\theta_2$, of the beam of light within the substrate falling upon the prismatic surface, wherein the prismatic surface has a refractive index of about 1.85.
Figure 10:
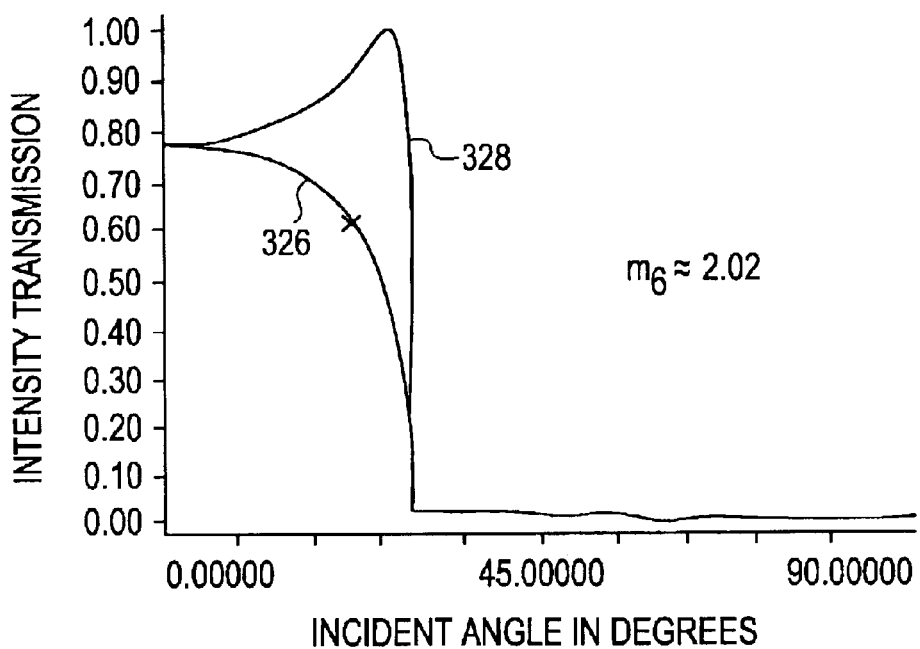
FIG. 10 is a graphical depiction of the intensity of s-polarized and p-polarized light that has exited the thin film coated prismatic surface of FIG. 3, as a function of the angle of incidence, $\theta_2$, of the beam of light within the substrate falling upon the prismatic surface, wherein the prismatic surface has a refractive index of about 2.02.

The sensitivity in the transmission of p-polarized light may also be improved by adjusting the refractive index of the prismatic surface 204 as seen in FIGS. 8, 9 and 10. In FIG. 8 a graphical depiction of the intensity of s-polarized 318 and p-polarized 320 light that has exited an approximately 58 nm quarter wave thick $TiO_2$ thin film coated prismatic surface 204 of FIG. 3, is shown as a function of the angle of incidence, $\theta_2$, of the beam of light 256 within the substrate 200 falling upon the prismatic surface 204, wherein the prismatic surface 204 has a refractive index, $n_6$, of about 1.65.

In FIG. 9 a graphical depiction of the intensity of s-polarized 322 and p-polarized 324 light that has exited an approximately 58 nm quarter wave thick $TiO_2$ thin film coated prismatic surface 204 of FIG. 3, as a function of the angle of incidence, $\theta_2$, of the beam of light 256 within the substrate 200 falling upon the prismatic surface 204, wherein the prismatic surface 204 has a refractive index, $n_6$, of about 1.85.

In FIG. 10 a graphical depiction of the intensity of s-polarized 326 and p-polarized 328 light that has exited an approximately 58 nm quarter wave thick $TiO_2$ thin film coated prismatic surface 204 of FIG. 3, as a function of the angle of incidence, $\theta_2$, of the beam of light 256 within the substrate 200 falling upon the prismatic surface 204, wherein the prismatic surface 204 has a refractive index, $n_6$, of about 2.02.

Figure 11:
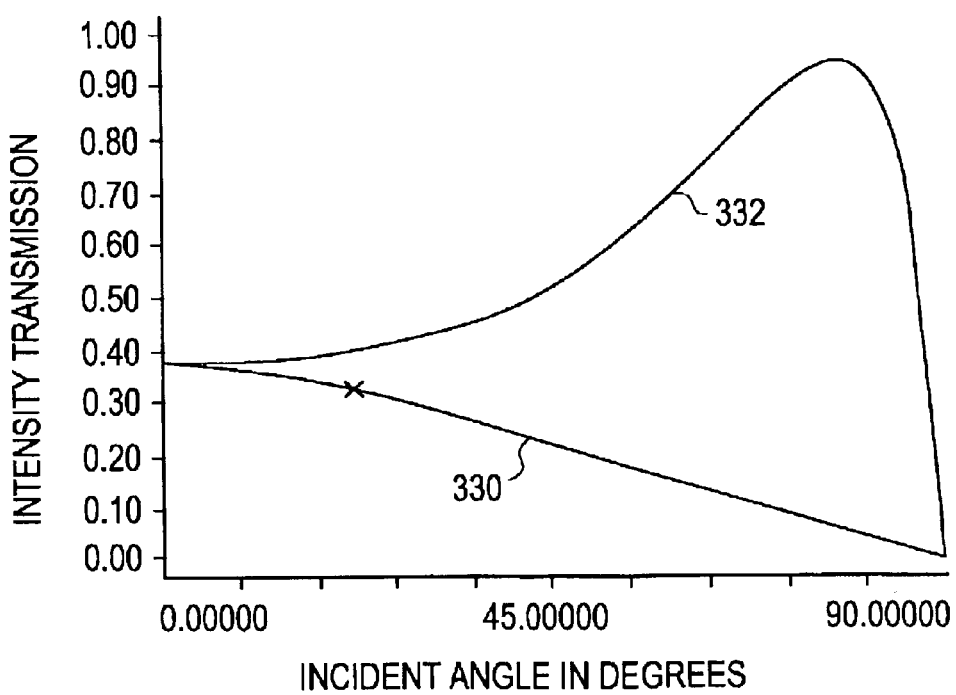
FIG. 11 is a graphical depiction of the intensity of s-polarized and p-polarized light within the polycarbonate substrate of FIG. 3, as a function of the angle of incidence, $\theta_1$, of a beam of light having a wavelength of about 550 nm falling upon a multi-layer quarter wave thin film coated stack on the planar surface of the substrate and wherein the substrate has a refractive index of about 1.59.
Figure 22:
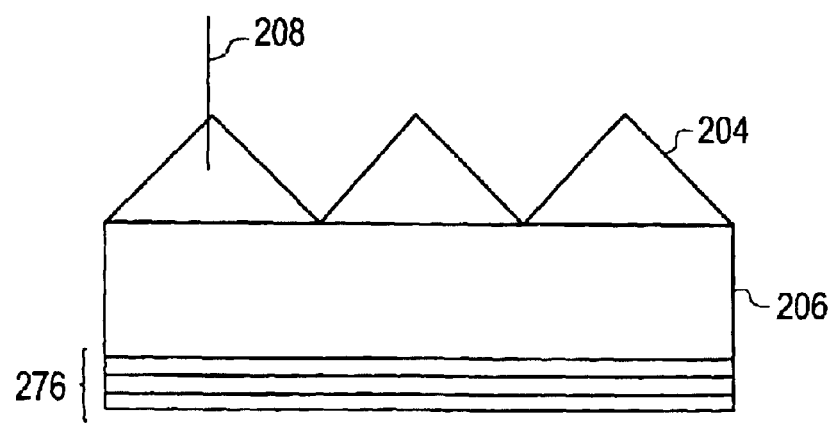
FIG. 22 is a cross sectional view of a segment of a thin film coated polarization sensitive optical substrate including a multi-layered thin film stack.

Yet further, the sensitivity in the transmission of p-polarized light may also be improved by the application of a multi-layered thin film stack (FIG. 22) on the planar or prismatic surfaces 204, 206. A multi-layered optical thin film "stack" comprises a plurality of optical thin films having alternatingly relatively high refractive indices interleaved with relatively low refractive indices or vise versa wherein the layers of the stack have thicknesses of $(1+2 \times k) \lambda/m/n$, where k and m are integers. In FIG. 11 a graphical depiction of the intensity of s-polarized 330 and p-polarized 332 light within the polycarbonate substrate 200 of FIG. 3 is shown, as a function of the angle of incidence, $\theta_1$, of a beam of light 212 having a wavelength of about 550 nm falling upon a three layer quarter wave thin film stack 270 (FIG. 22) coated onto the planar surface 206 (or prismatic surface 204) of the substrate 200 and wherein the substrate 200 has a refractive index of about 1.59. The stack of thin films 270 may comprise a high-low-high stack such as a 94 nm $SiO_2$ thin film sandwiched between two 58 nm $TiO_2$ thin films, or a low-high-low stack such as a 58 nm $TiO_2$ thin film sandwiched between two 94 nm $SiO_2$ thin films.

Figure 12:
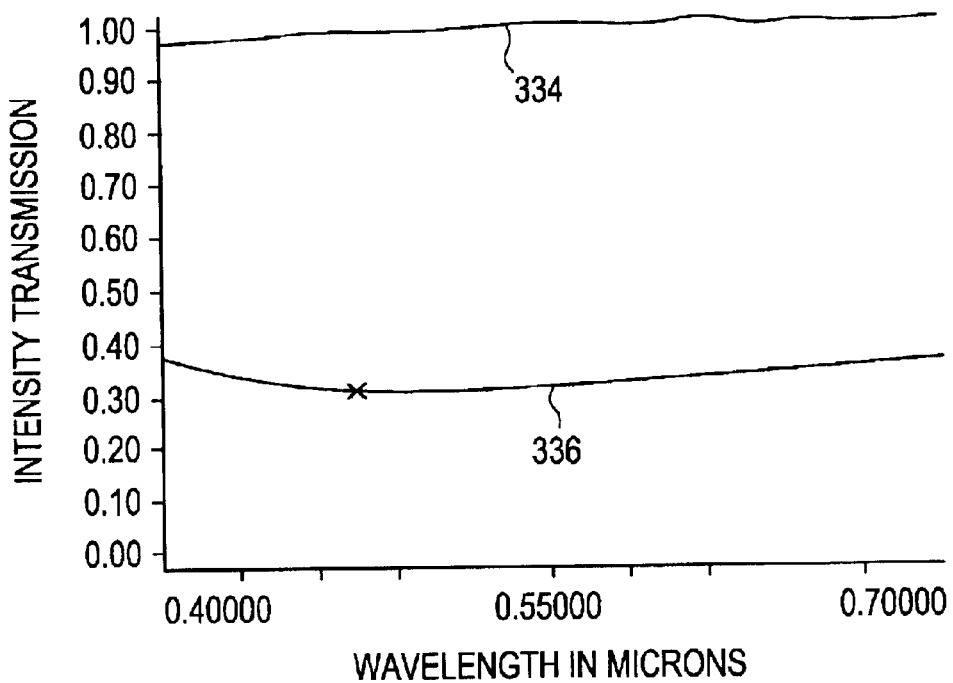
FIG. 12 is a graphical depiction of the intensity of s-polarized and p-polarized light within the polycarbonate substrate of FIG. 3, as a function of wavelength for a constant angle of incidence, $\theta_1 \approx 70$ degrees, of a beam of light falling upon an approximately 58 nm thick $TiO_2$ thin film coated planar surface of the substrate and wherein the substrate has a refractive index of about 1.59.

It is also noted that the sensitivity in the transmission of p-polarized light may be substantially wavelength independent. In FIG. 12 a graphical depiction of the intensity of s-polarized 336 and p-polarized 334 light within the polycarbonate substrate 200 of FIG. 3, as a function of wavelength for a constant angle of incidence, $\theta_1 \approx 70$ degrees, of a beam of light 212 falling upon an approximately 58 nm quarter wave thick $TiO_2$ thin film coated planar surface 206 of the substrate 200 and wherein the substrate 200 has a refractive index of about 1.59. As can be seen in FIG. 12, over the approximate visible spectrum, both s-polarized 336 and p-polarized 334 light are nearly constant, and the intensity of the p-polarized 334 light is greater than that of the s-polarized 336 light.

Figure 13:
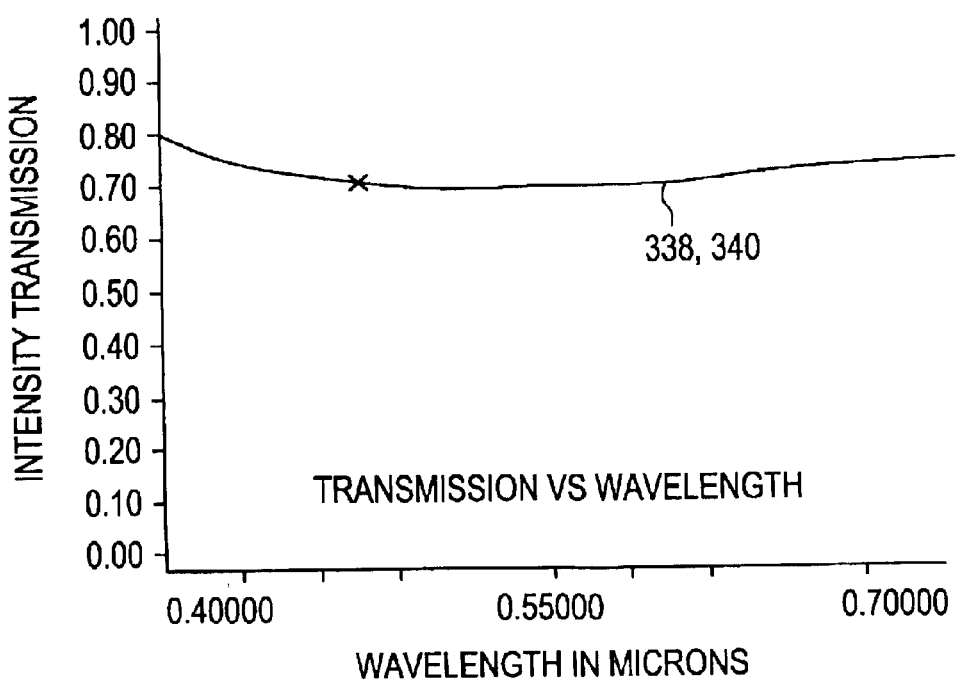
FIG. 13 is a graphical depiction of the intensity of s-polarized and p-polarized light within the polycarbonate substrate of FIG. 3, as a function of wavelength for a constant angle of incidence, $\theta 1 \approx 0$ degrees, of a beam of light falling upon an approximately 58 nm thick $TiO_2$ thin film coated planar surface of the substrate and wherein the substrate has a refractive index of about 1.59.

In FIG. 13 a graphical depiction of the intensity of the s-polarized and p-polarized light within the polycarbonate substrate 200 of FIG. 3, as a function of wavelength for a constant angle of incidence, $\theta_1 \approx 0$ degrees, of a beam of light 212 falling upon an approximately 58 nm quarter wave thick $TiO_2$ thin film coated planar surface 206 of the substrate 200 and wherein the substrate 200 has a refractive index of about 1.59. As can be seen in FIG. 13, over the approximate visible spectrum, both s-polarized 336 and p-polarized 334 light are nearly constant, and equal due to the zero degree angle of incidence.

Figure 14:
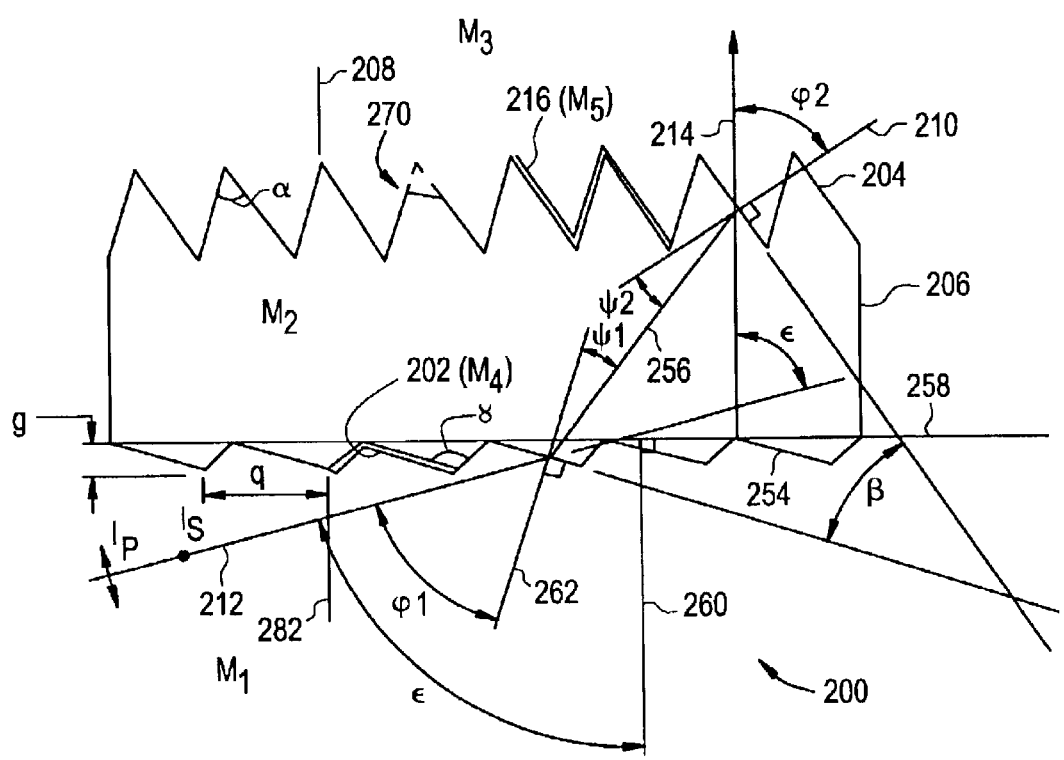
FIG. 14 is a third cross section of a segment of a thin film coated polarization sensitive optical substrate including two opposing prismatic structures or surfaces and showing the path of light therethrough.

In an alternative embodiment of the substrate 200, FIG. 14 shows a third cross section of a segment of the thin film coated polarization sensitive optical substrate 200 having two opposing prismatic surfaces 204, 254. The path of the light beam 212, 256, 214 passing therethrough is depicted. A first prismatic surface 254 comprises a plurality of prism structures having a peak angle of $\gamma$, a pitch between peaks of q, length, l, and a height of g. The first prismatic surface 254 may be coated with the first thin film 202 and the second prismatic surface 204 may also be coated with the second thin film 216. The facets of the prism structures of the opposing surfaces 204, 254 are such as to subtend an angle of $\beta$ therebetween. The beam of light 212, emanating for example from a backlight display device and having parallel, $I_p$ ⊕ and perpendicular, $I_s$ (•), components of polarization, is incident upon the first prismatic surface 254 both at an angle of $\in$ with respect to a normal 260 to a plane 258 of the planar surface 206, and at an angle of $\phi_1$ with respect to a normal 262 to the face of the prism structure 254. As noted above, according to well known optical principles, the beam of light 212 when passing from a medium of refractive index $n_1$ to a medium of refractive index $n_2$, where $n_2$ is greater than $n_1$, is deflected so as to follow the path 256, subtending an angle of $\psi$ 1 with respect to the normal 262, within the optical substrate 200. The beam of light 256 within the optical substrate 200 then falls upon the prismatic surface 204 at an angle of $\psi$ 2 with respect to a normal 210 thereto. Again, according to well known optical principles, when passing from a medium of refractive index $n_2$ to a medium of refractive index $n_3$, where $n_2$ is greater than $n_3$, the beam of light 256 is deflected so as to follow the path 214, subtending an angle of $\phi_2$ with respect to the normal 210. In a symmetric arrangement, $\phi_1=\phi_2=\phi$ and $\psi_1=\psi_2\psi$, and it can be shown that 2 $\phi=\in+\beta$ and $\beta=2$ $\psi$. For a substrate 200 having an index of refraction of $n \approx 1.59$, $\in \approx 80$ degrees, $\phi \approx 78$ degrees and $\beta \approx 76$ degrees, without the thin film coatings on the surfaces 204, 206 of the substrate 200 the total (two surface) power transmission for the s- and p-polarized light was $T_p \approx 70\%$ and $T_s \approx 24\%$, while with thin film $TiO_2$ coatings $T_p \approx 99\%$ and $T_s \approx 2\%$.

Figure 23:
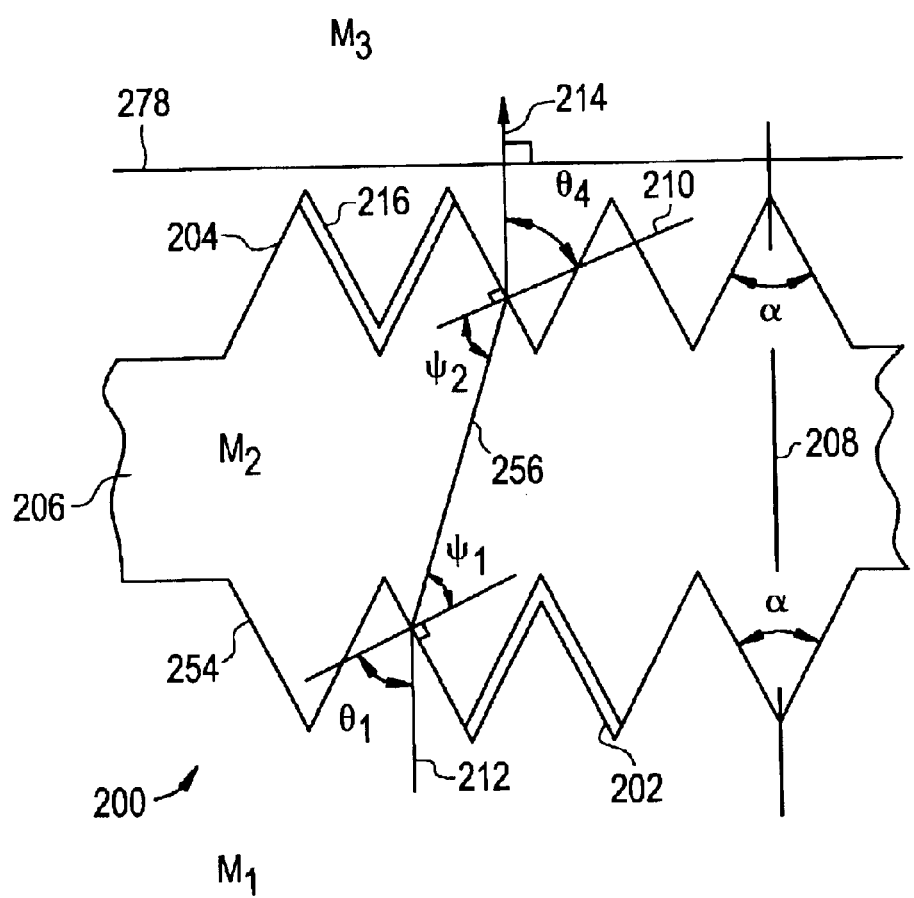
FIG. 23 is a cross sectional view of a segment of a thin film coated polarization sensitive optical substrate including two opposing prismatic structures or surfaces having the same pitch, height, peak angle and length with their peaks aligned and showing the path of light therethrough.

In FIG. 23, the first and second prismatic surfaces 204, 254 each may have the same pitch, p, height, h, peak angle, $\alpha$, length, l, and may or may not have their peaks aligned with one another along the vertical prism axis 208. The peak angle, $\alpha$, is less than or equal to 80 degrees and more preferably less than or equal to 60 degrees. The first prismatic surface 254 may be coated with the first thin film 202 and the second prismatic surface 204 may also be coated with the second thin film 216. A beam of light 212 enters the substrate 206 perpendicular to a nominal film plane 278 (or the planar surface 258) and at an angle $\theta_1$ with respect to the prismatic surface 254. According to well known optical principals the beam 212 thus follows the path 256 within the substrate 206 and exits the substrate 206 at an angle of $\theta_4$ with respect to the prismatic surface 204 and also perpendicular to the nominal film plane 278.

Figure 15:
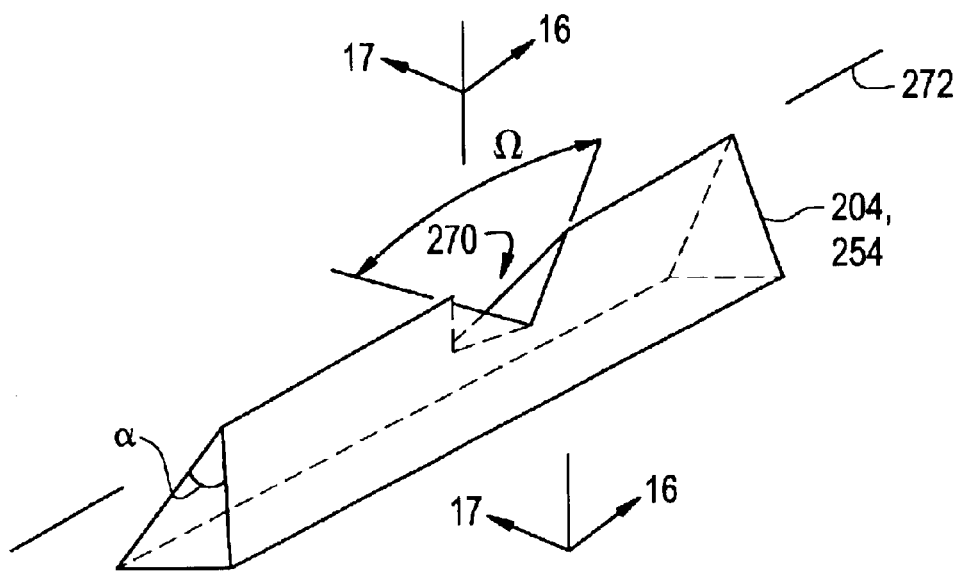
FIG. 15 is a segment of a prismatic structure having a notch formed therein.
Figure 16:
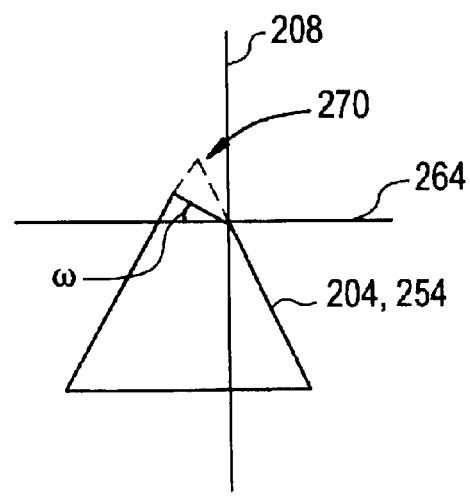
FIG. 16 is a first sectional view of the segment of the prismatic structure of FIG. 15 viewed along the length of the prismatic structure.
Figure 17:
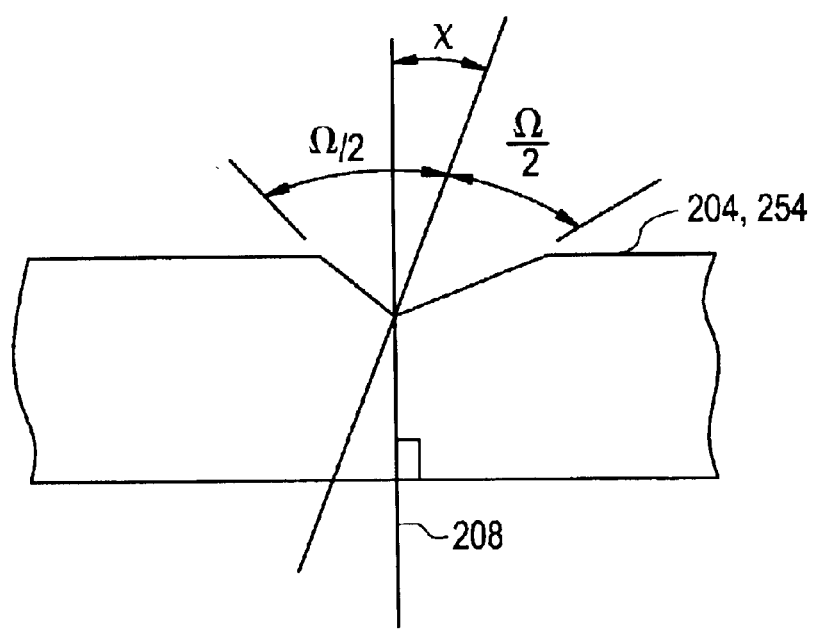
FIG. 17 is a second sectional view of the segment of the prismatic structure of FIG. 15 viewed perpendicular to the length of the prismatic structure.
Figure 18:
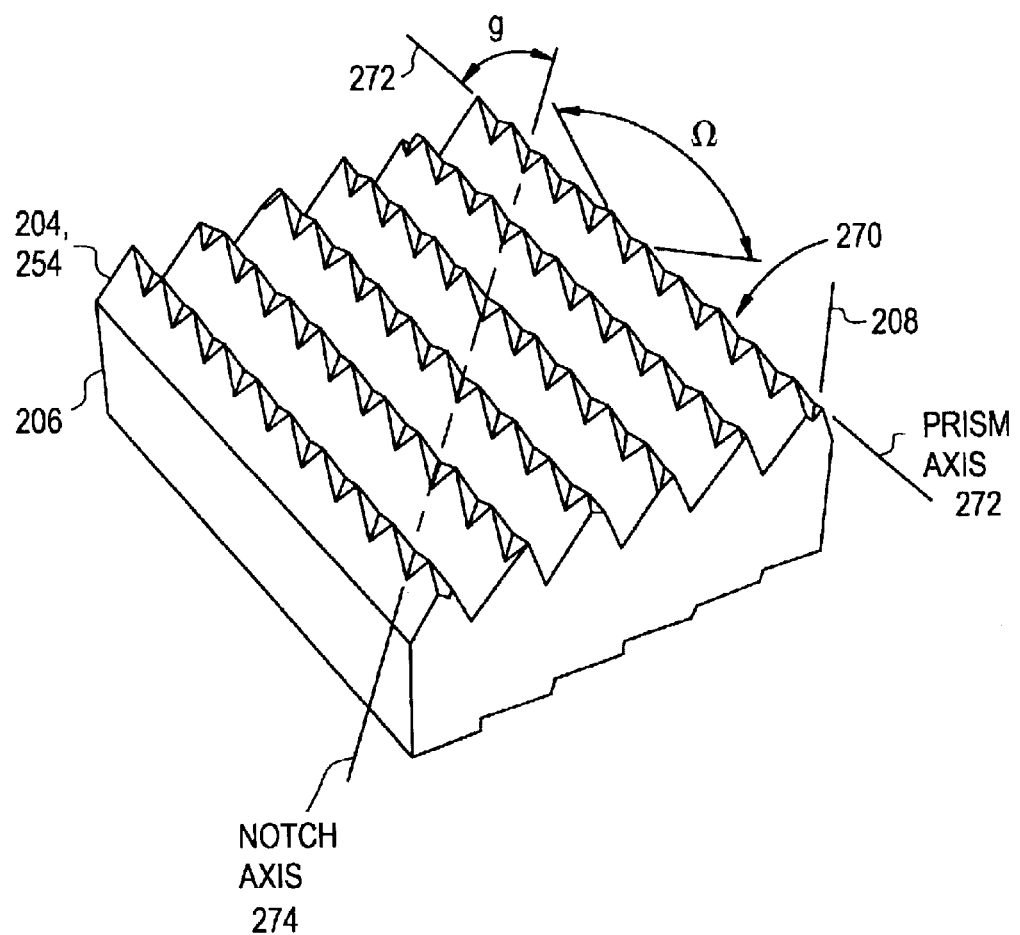
FIG. 18 is a three dimensional view of the optical substrate showing the orientation of the notches of FIGS. 15, 16 and 17 with respect to prism axes.

In FIG. 15 a segment of either of the prismatic surfaces 204, 254 is shown. In the prismatic surface 204, 254 a segment thereof, or "notch" is shown at 270. The "notch" 270 is formed by removing a portion of the prismatic surface 204, 254 at the peak thereof so as to subtend an angle $\Omega$. As best understood from FIGS. 15, 16 and 17, the notch 270 may be oriented at an angle w with respect to a horizontal axis 264 as viewed along the length of the prismatic surface 204, 254 in FIG. 16, and may also be oriented at an angle $\chi$ with respect to the vertical axis 208 as viewed perpendicular to the prismatic surface 204, 254 in FIG. 17. The notch 270 also has a notch axis 274 such that the notch 270 also subtends an angle of $\rho$ with respect to the prism axis 272 (FIG. 18). The purpose of the cross cut "notch" feature 270 is to transform the polarization state of s-polarized light that is reflected from the primary upper working face and the surface of the notch 270. The notch 270 forms a totally internally reflecting structure that is oriented so that light that is s-polarized with respect to the prism axis 272 is not s-polarized with respect to the notch axis 274. Since this light is reflected by the notch 270 and contains both s- and p-polarization components with respect to the notch 270, the notch 270 may be designed to create a phase difference between reflected components (e.g., local s- and p-polarizations) such that polarization is transformed with respect to the nominal prism axis 272. This will aid polarization recycling. Additional or alternative polarization converting or scrambling devices may also be employed.

Figure 19:
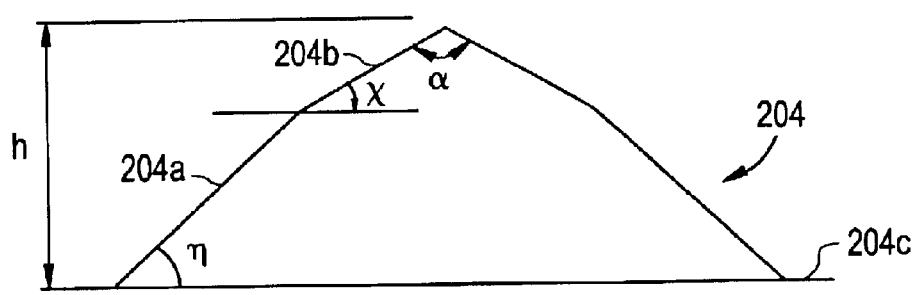
FIG. 19 is a cross sectional view of a prism having multiple facets.
Figure 20:
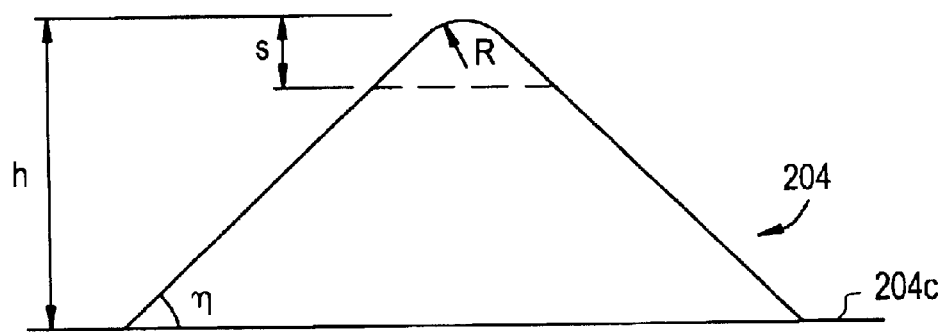
FIG. 20 is a cross sectional view of a prism having a rounded or truncated peak.

In FIGS. 19 and 20, because little of the first pass p-polarized light is incident near the peak of the prism structures 204 it can be seen that the cross sectional geometry of the prism structures 204 of the prismatic surface may be modified to reduce the transmission of s-polarized light. In particular, in FIG. 19, the side facets of the prism 204 are so as to form one or more compound facets 204a, 204b, respectively subtending an angle of η or κ with the base of the prism 204c. Furthermore, in FIG. 20 the peak of the prism 204 may be rounded with a radius R or truncated to a depth, s.

Embodiments of the optical substrates have been described with respect to use in backlight displays or the like. The optical substrates, however, can be used in a wide variety of other applications as well. Embodiments of the substrates can be used in Fresnel lenses, hybrid glass/plastic lenses, optical disks, diffuser films, holographic substrates or in combination with conventional lenses, prisms or mirrors. The optical substrates can also be used in single or multi-order reflective, transmissive or partially transmissive, devices, whether light absorbing or non-light absorbing; prisms, holographic optical elements, or diffraction gratings. The substrates can be used in other applications such as projection displays, illuminated signs, and traffic signals.

Thus, based upon the foregoing description, a polarization sensitive optical substrate has been disclosed which comprises a planar surface and a first thin film applied to the planar surface. The first thin film has a thickness of $\lambda/4/$, where $\lambda$ is the wavelength of light incident upon the first film and n is the refractive index of the first thin film. A prismatic surface having a prescribed peak angle, α, height, h, length, l, and pitch, p, is optionally also thin film coated, and is in opposition to the planar surface. Yet further, the planar surface may be replaced with a similar prismatic surface, and one or both prismatic surfaces may be randomized in their peak angle, α, height, h, length, l and pitch, p. The optical substrate may also include a multi-layer thin film stack.

Any references to first, second, etc. or front and back, right and left, top and bottom, upper and lower, and horizontal and vertical, or any other phrase that relates one variable or quantity with respect to another are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A polarization sensitive optical substrate for discriminating between states of polarization of light, the optical substrate comprising:
   a first surface;
   a first optical film applied to the first surface, the first optical film having a thickness of $(1+2\times k) \lambda/m/n_1$, where k and m are integers, $\lambda$ is the wavelength of light incident upon the first optical film and $n_1$ is the refractive index of the first optical film; and
   a second surface positioned in opposition to the first surface;
   the optical substrate having a prescribed refractive index.

2. The polarization sensitive optical substrate as set forth in claim 1 wherein the first surface comprises a planar surface.

3. The polarization sensitive optical substrate as set forth in claim 1 further comprising a second optical film applied to the second surface, the second optical film having a thickness of $(1+2\times j) \lambda/m/n_2$, where m and j are integers, $\lambda$ is the wavelength of light incident upon the second optical film and $n_2$ is the refractive index of the second optical film.

4. The polarization sensitive optical substrate as set forth in claim 1 wherein the second surface comprises a first prismatic surface having a plurality of prisms, each prism having a plurality of facets intersecting at a peak so as to subtend a peak angle, α.

5. The polarization sensitive optical substrate as set forth in claim 4 wherein the first surface comprises a second prismatic surface having a plurality of prisms aligned along a second prism axis, each prism having a plurality of facets.

6. The polarization sensitive optical substrate as set forth in claim 1 wherein the first optical film comprises a metal oxide.

7. The polarization sensitive optical substrate as set forth in claim 3 wherein the second optical film comprises a metal oxide.

8. The polarization sensitive optical substrate as set forth in claim 5 wherein a facet of the first surface and a facet of the second surface are positioned so as to subtend a prescribed angle, β, therebetween.

9. The polarization sensitive optical substrate as set forth in claim 4 wherein the second surface comprises a material having a refractive index different than the refractive index of the optical substrate.

10. The polarization sensitive optical substrate as set forth in claim 4 wherein the first prismatic surface includes a recessed notch positioned so as to have a notch axis oriented at an angle, ρ, with respect to the prism axis.

11. The polarization sensitive optical substrate as set forth in claim 10 wherein the recessed notch subtends a notch angle, Ω.

12. The polarization sensitive optical substrate as set forth in claim 4 wherein the plurality of facets form one or more compound facets respectively subtending an angle of η or κ with the base of the prism.

13. The polarization sensitive optical substrate as set forth in claim 4 wherein the plurality of prisms include a rounded peak with a radius R.

14. The polarization sensitive optical substrate as set forth in claim 4 wherein the plurality of prisms include a truncated peak wherein the truncation has a prescribed depth, s.

15. The polarization sensitive optical substrate as set forth in claim 1 further comprising a third optical film applied to the first optical film and having a thickness of $(1+2\times k) \lambda/m/n_3$, where k and m are integers, $\lambda$ is the wavelength of light incident upon the first optical film and $n_3$ is the refractive index of the third optical film wherein $n_3$ is different than $n_1$.

16. The polarization sensitive optical substrate as set forth in claim 1 further comprising a multi-layered optical film stack applied to the first and second surfaces including a plurality of optical films having alternatingly relatively high refractive indices interleaved with optical films having relatively low refractive indices.

17. A backlight display device comprising:
an optical source for generating light;
a light guide for guiding the light therealong;
a reflective device positioned along the light guide for reflecting the light out of the light guide;
a polarization sensitive optical substrate receptive of the light from the light guide for discriminating between states of polarization of the light, the optical substrate comprising:
a first surface;
a first optical film applied to the first surface, the first optical film having a thickness of $(1+2 \times k) \lambda/m/n_1$, where k and m are integers, $\lambda$ is the wavelength of light incident upon the first optical film and $n_1$ is the refractive index of the first optical film; and
a second surface positioned in opposition to the first surface;
the optical substrate having a prescribed refractive index.

18. The backlight display device as set forth in claim 17 wherein the first surface comprises a planar surface.

19. The backlight display device as set forth in claim 17 further comprising a second optical film applied to the second surface, the second optical film having a thickness of $(1+2 \times j) \lambda/m/n_2$, where m and j are integers, $\lambda$ is the wavelength of light incident upon the second optical film and $n_2$ is the refractive index of the second optical film.

20. The backlight display device as set forth in claim 17 wherein the second surface comprises a first prismatic surface having a plurality of prisms aligned along a prism axis, each prism having a plurality of facets.

21. The backlight display device as set forth in claim 20 wherein the first surface comprises a second prismatic surface having a plurality of prisms aligned along a prism axis, each prism having a plurality of facets.

22. The backlight display device as set forth in claim 17 wherein the first optical film comprises a metal oxide.

23. The backlight display device as set forth in claim 19 wherein the second optical film comprises a metal oxide.

24. The backlight display device as set forth in claim 21 wherein a facet of the first surface and a facet of the second surface are positioned so as to subtend a prescribed angle, $\beta$, therebetween.

25. The backlight display device as set forth in claim 20 wherein the second surface comprises a material having refractive index different than the refractive index of the optical substrate.

26. The backlight display device as set forth in claim 20 wherein the first prismatic surface includes a recessed notch positioned so as to have a notch axis oriented at an angle, $\rho$, with respect to the prism axis.

27. The backlight display device as set forth in claim 26 wherein the recessed notch subtends a notch angle, $\Omega$.

28. The backlight display device as set forth in claim 20 wherein the plurality of facets form one or more compound facets respectively subtending an angle of $\eta$ or $\kappa$ with the base of the prism.

29. The backlight display device as set forth in claim 20 wherein the plurality of prisms include a rounded peak with a radius R.

30. The backlight display device as set forth in claim 20 wherein the plurality of prisms include a truncated peak wherein the truncation has a prescribed depth, s.

31. The backlight display device as set forth in claim 17 further comprising a third optical film applied to the first optical film and having a thickness of $(1+2 \times k) \lambda/m/n_3$, where k and m are integers, $\lambda$ is the wavelength of light incident upon the first optical film and $n_3$ is the refractive index of the third optical film wherein $n_3$ is different than $n_1$.

32. The backlight display device as set forth in claim 17 further comprising a multi-layered optical film stack applied to the first and second surfaces including a plurality of optical films having alternatingly relatively high refractive indices interleaved with optical films having relatively low refractive indices.

33. The backlight display device as set forth in claim 1 wherein the first optical film is approximately 58 nm thick.

34. The backlight display device as set forth in claim 5 wherein the first prismatic surface 204 and the second prismatic surface have the same pitch, p, height, h, peak angle, $\alpha$, length, l, and the peaks thereof are aligned along the same axis.

35. The backlight display device as set forth in claim 7 wherein the metal oxide is titanium oxide.

36. The backlight display device as set forth in claim 17 wherein the first optical film is approximately 58 nm thick.

37. The backlight display device as set forth in claim 23 wherein the metal oxide is titanium oxide.

38. The backlight display device as set forth in claim 1 wherein m equals four.

39. The backlight display device as set forth in claim 3 wherein m equals four.

40. The backlight display device as set forth in claim 15 wherein m equals four.

41. The backlight display device as set forth in claim 17 wherein m equals four.

42. The backlight display device as set forth in claim 19 wherein m equals four.

43. The backlight display device as set forth in claim 31 wherein m equals four.

44. The backlight display device as set forth in claim 4 wherein $\alpha$ is less than or equal to 80 degrees.

45. The backlight display device as set forth in claim 17 further comprising a diffuser receptive of the light from the optical substrate for diffusing the light.

46. The backlight display device as set forth in claim 45 wherein the diffuser comprises a retarder film for rotate the plane of polarization of the light exiting the optical substrate so as to match the input polarization axis of an liquid crystal display.

47. The backlight display device as set forth in claim 46 wherein the diffuser comprises a textured or untextured polymer substrate stretched along one axis thereof in a plane of the substrate.

* * * * *

UNITED STATES PATENT AND TRADEMARK OFFICE
CERTIFICATE OF CORRECTION

PATENT NO. : 6,811,274 B2
DATED : November 2, 2004
INVENTOR(S) : Eugene Olczak

It is certified that error appears in the above-identified patent and that said Letters Patent is hereby corrected as shown below:

Title page,
Item [56], References Cited, OTHER PUBLICATIONS, insert
-- A. Tagaya, Y. Koike, "Highly Scattering Optical Transmission Polymers for Bright display", pages 1163-1164.
S.G. Saxe, Solar Energy Materials, Prismatic Film Light Guides: Performance and Recent Developments Vol. 19, No. 95-109, North-Holland, Amsterdam, Pages 95-109 --
Item [57], ABSTRACT,
Line 3, after "thickness of" delete "$\lambda/4/h$" and insert therefor -- $\lambda/4/n$ --

Column 1,
Line 42, after "thickness of" delete "$\lambda/4/,$" and insert therefor -- $\lambda/4/n$ --
Line 65, after "thickness of" delete "$\lambda/4/,$" and therefor -- $\lambda/4/n$ --

Column 4,
Line 62, after "(1+2xj)" delete "$\lambda/4/,$" and insert therefor -- $\lambda/4/n$ --

Column 5,
Line 4, after "of" delete "$\lambda/4/n5$" and insert therefor -- $\lambda/4/.n5$ --

Column 8,
Line 17, after "refractive index" delete "n $_3$" and insert therefor -- $n_3$ --
Line 21, after "$\Phi_1= \Phi_2= \Phi$ and" delete "$\Psi_1=\Psi_2\Psi,$" and therefor -- $\Psi_1= \Psi_2= \Psi$, --
Line 50, after "angle" delete "w" and insert therefor -- $\omega$ --

Column 9,
Line 34, after "of" delete "$\lambda/4/,$" and insert therefor -- $\lambda/4/n$ --

Signed and Sealed this

Ninth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,811,274 B2
DATED : November 2, 2004
INVENTOR(S) : Eugene Olczak

It is certified that error appears in the above-identified patent and that said Letters Patent is hereby corrected as shown below:

Title page,
Item [56], References Cited, OTHER PUBLICATIONS, insert -- A. Tagaya, Y. Koike, "Highly Scattering Optical Transmission Polymers for Bright display", Pages 1163-1164.

S.G. Saxe, Solar Energy Materials, Prismatic Film Light Guides: Performance and Recent Developments Vol. 19, No. 95-109, North-Holland, Amsterdam, Pages 95-109 --.

Item [57], ABSTRACT,
Line 3, after "thickness of" delete "$\lambda/4/h$" and insert therefor -- $\lambda/4/n$ --.

Column 1,
Line 42, after "thickness of" delete "$\lambda/4/$," and insert therefor -- $\lambda/4/n$ --.
Line 65, after "thickness of" delete "$\lambda/4/$," and insert therefor -- $\lambda/4/n$ --.

Column 4,
Line 62, after "(1+2xj)" delete "$\lambda/4/$," and insert therefor -- $\lambda/4/n$ --.

Column 5,
Line 4, after "of" delete "$\lambda/4/n5$" and insert therefor -- $\lambda/4/.n5$ --.

Column 8,
Line 17, after "refractive index" delete "n $_3$" and insert therefor -- $n_3$ --.
Line 21, after "$\Phi_1 = \Phi_2 = \Phi$ and" delete "$\Psi_1 = \Psi_2 \Psi$," and insert therefor -- $\Psi_1 = \Psi_2 = \Psi$, --.
Line 50, after "angle" delete "w" and insert therefor -- $\omega$ --.

UNITED STATES PATENT AND TRADEMARK OFFICE
CERTIFICATE OF CORRECTION

PATENT NO. : 6,811,274 B2
DATED : November 2, 2004
INVENTOR(S) : Eugene Olczak

It is certified that error appears in the above-identified patent and that said Letters Patent is hereby corrected as shown below:

Column 9,
Line 34, after "of" delete "$\lambda/4/$," and insert therefor -- $\lambda/4/n$ --.

Signed and Sealed this

Thirtieth Day of August, 2005

JON W. DUDAS
*Director of the United States Patent and Trademark Office*